United States Patent [19]

Miyakawa et al.

[11] Patent Number: 5,130,824
[45] Date of Patent: Jul. 14, 1992

[54] SYSTEM FOR AND METHOD OF READING IMAGE INFORMATION

[75] Inventors: Tadashi Miyakawa; Shinji Itoh; Yukihisa Ozaki, all of Kanagawa, Japan

[73] Assignee: Fuji Photo Film Co., Ltd., Kanagawa, Japan

[21] Appl. No.: 717,595

[22] Filed: Jun. 19, 1991

[30] Foreign Application Priority Data

Jun. 22, 1990 [JP] Japan .................. 2-165321

[51] Int. Cl.$^5$ .............................................. H04N 1/04
[52] U.S. Cl. ..................................... 358/486; 358/408
[58] Field of Search ............. 358/486, 474–475, 358/468, 494–496, 408

[56] References Cited

U.S. PATENT DOCUMENTS 4,779,121 10/1988 Okumura ........................ 358/475
5,072,303 12/1991 Silverberg ...................... 358/486
5,089,901 2/1992 Kaneko ......................... 358/494

Primary Examiner—Stephen Brinich
Attorney, Agent, or Firm—Sughrue, Mion, Zinn, Macpeak & Seas

[57] ABSTRACT

An image information reading system comprising a plurality of preset apparatuses each having a first scan mechanism for reading image information carried by an original while scanning the same, and a processing condition setting-up device for setting up scanning conditions of the read image information and image processing conditions used to process the read image information, and at least one main scan apparatus having a second scan mechanism for reading image information recorded on an original while scanning the same, and an image information processing device for processing the image information read by the second scan mechanism on the basis of the scanning conditions and the image processing conditions determined by any one of the preset apparatuses.

5 Claims, 9 Drawing Sheets

SYSTEM FOR AND METHOD OF READING IMAGE INFORMATION

BACKGROUND OF THE INVENTION

1. Field of the Invention

The present invention relates to a system for and a method of reading information wherein a plurality of preset apparatuses for carrying out pre-scan processes and set-up processes and a main scan apparatus for performing a main scan process can be arbitrarily combined, thereby making it possible to achieve high operating efficiency.

2. Description of the Related Art

An image information reading device is conventionally used in the printing and platemaking fields for electrically processing image information recorded in originals or subjects to produce original film plates with a view toward simplifying the entire process and improving the quality of printed images.

In the image information reading device, an original with image information recorded therein is held in an original cassette, and the original cassette storing the original is fed to an image information reading unit by a cassette feed mechanism. The image information carried by the original is first read at a coarse pitch by an image information reading mechanism (this is referred to as "pre-scan"). Thereafter, scanning conditions and image processing conditions are set to the so-read image information (this is referred to as "set-up"). The set up original is read again at a fine pitch by the image information reading mechanism, the so-read image information then being processed according to the scanning conditions and the image processing conditions set up as described above, thereby determining desired processed image information (this is referred to as "main scan").

However, when the entire process is carried out by a single image input processing device at the time that the desired processed image information is determined from the original in the above-described manner, respective apparatuses subjected to a set-up process remain idle while being in a pre-scan operation and in a main scan operation. On the other hand, the operations of both the cassette feed mechanism and the image input processing mechanism must be stopped while the apparatuses subjected to the set-up process are being activated. Therefore, a limitation is imposed on the quantity of originals which can be processed in a day, so that the operating efficiency of the image information reading device cannot be improved.

SUMMARY OF THE INVENTION

It is a principal object of the present invention to provide a system for and a method of reading image information wherein an image information reading device is divided into a plurality of units, and the so-divided respective units are operated in parallel with one another so as to avoid stopping their operations, thereby making it possible to improve the operating efficiency of each unit.

It is another object of the present invention to provide an image information reading system comprising a plurality of preset apparatuses each having a first scan mechanism for reading image information carried by an original while scanning the same, and processing condition setting-up means for setting up scanning conditions of the read image information and image processing conditions used to process the read image information, and at least one main scan apparatus having a second scan mechanism for reading image information recorded on an original while scanning the same, and image information processing means for processing the image information read by the second scan mechanism on the basis of the scanning conditions and the image processing conditions determined by one of the preset apparatuses.

It is a further object of the present invention to provide the image information reading system wherein the preset apparatuses exceed in number the main scan apparatus.

It is a still further object of the present invention to provide a method of reading image information, comprising the following steps: a first step of performing a pre-scan operation for reading an original storing image information at a coarse pitch by a prescan device; a second step of setting scanning conditions and image information processing conditions to the read image information with a set-up device; a third step of specifying an original cassette storing a desired original by original cassette specifying means disposed in an original cassette feeding device; a fourth step of reading set-up information of the original held in the specified original cassette from the set-up device; and a fifth step of carrying out a main scan operation for reading an original at a fine pitch by a main scan apparatus based on the scanning conditions included in the set-up information.

It is a still further object of the present invention to provide the method wherein the first and second steps are carried out by a preset apparatus comprising the pre-scan device and the set-up device, and the fifth step is performed by the main scan apparatus.

It is a still further object of the present invention to provide the method wherein a cassette detector of the main scan apparatus includes a step for reading information used to specify a desired original cassette, the information being applied to each of original cassettes which are fed.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
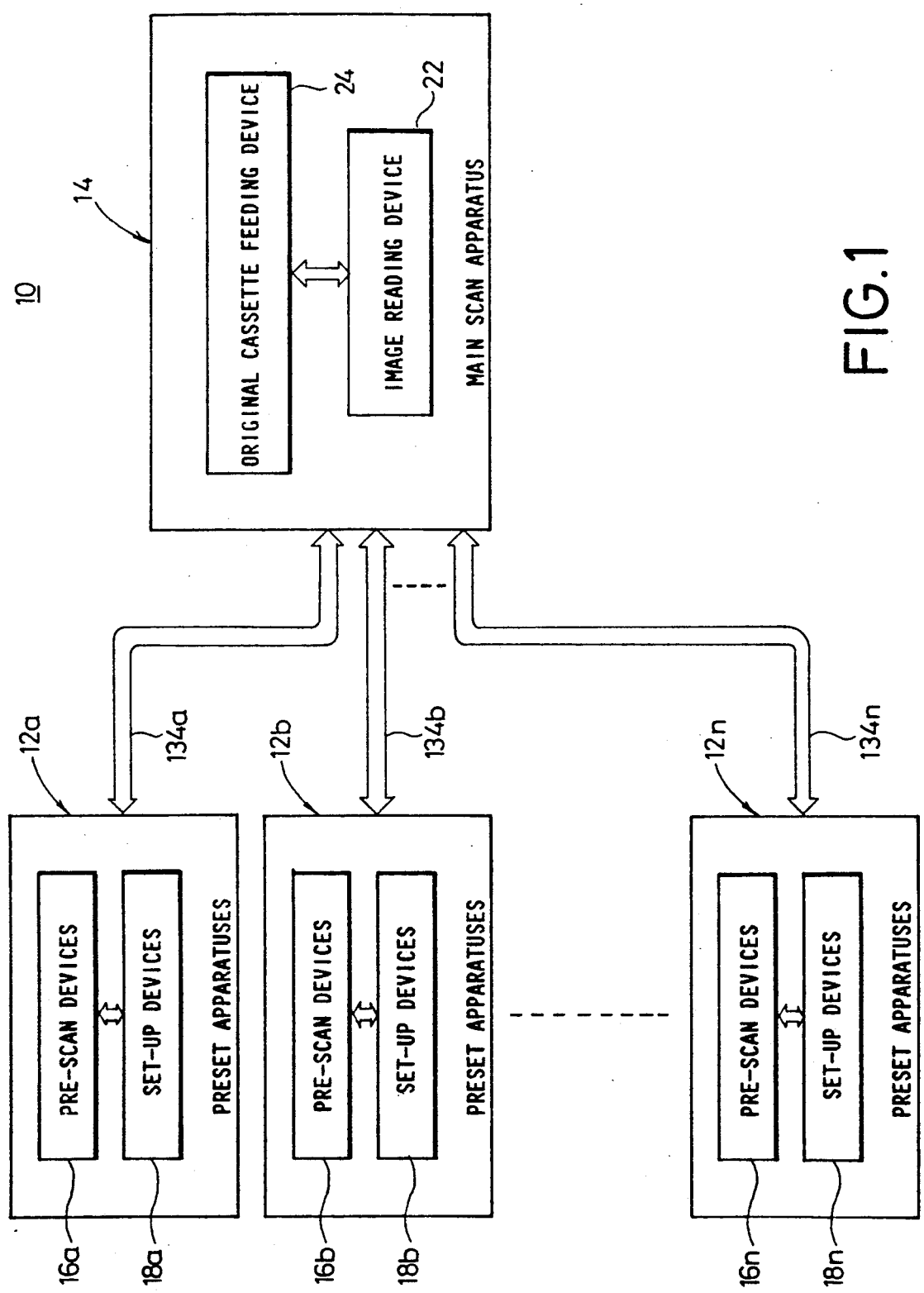
FIG. 1 is a block diagram showing a structure of a system according to one embodiment of the present invention for and a method of reading image information.

FIG. 1 is a block diagram showing a structure of a system for reading image information according to one embodiment of the present invention. In the same drawing, designated at numeral 10 is an image information reading system. The image information reading system 10 basically comprises a plurality of preset apparatuses 12a through 12n and a main scan apparatus 14.

The preset apparatuses 12a through 12n respectively comprise pre-scan devices 16a through 16n used to read image information of an original or subject S at a rough pitch, and set-up devices 18a through 18n used to establish conditions such as scanning condition at the time the image information of the original S is read, an image processing condition for processing read image information, etc., i.e., set up such conditions.

The main scan apparatus 14 comprises an original cassette feeding device 24 for selecting, for example, a desired original cassette 20a from a plurality of original cassettes stored in position so as to feed the thus selected casssette 20a to an image reading device 22 to be described later, and the image reading device 22 for reading image information of an original S held in the original cassette 20a delivered from the original cassette feeding device 24 based on the set up information about the conditions referred to above.

Figure 2:
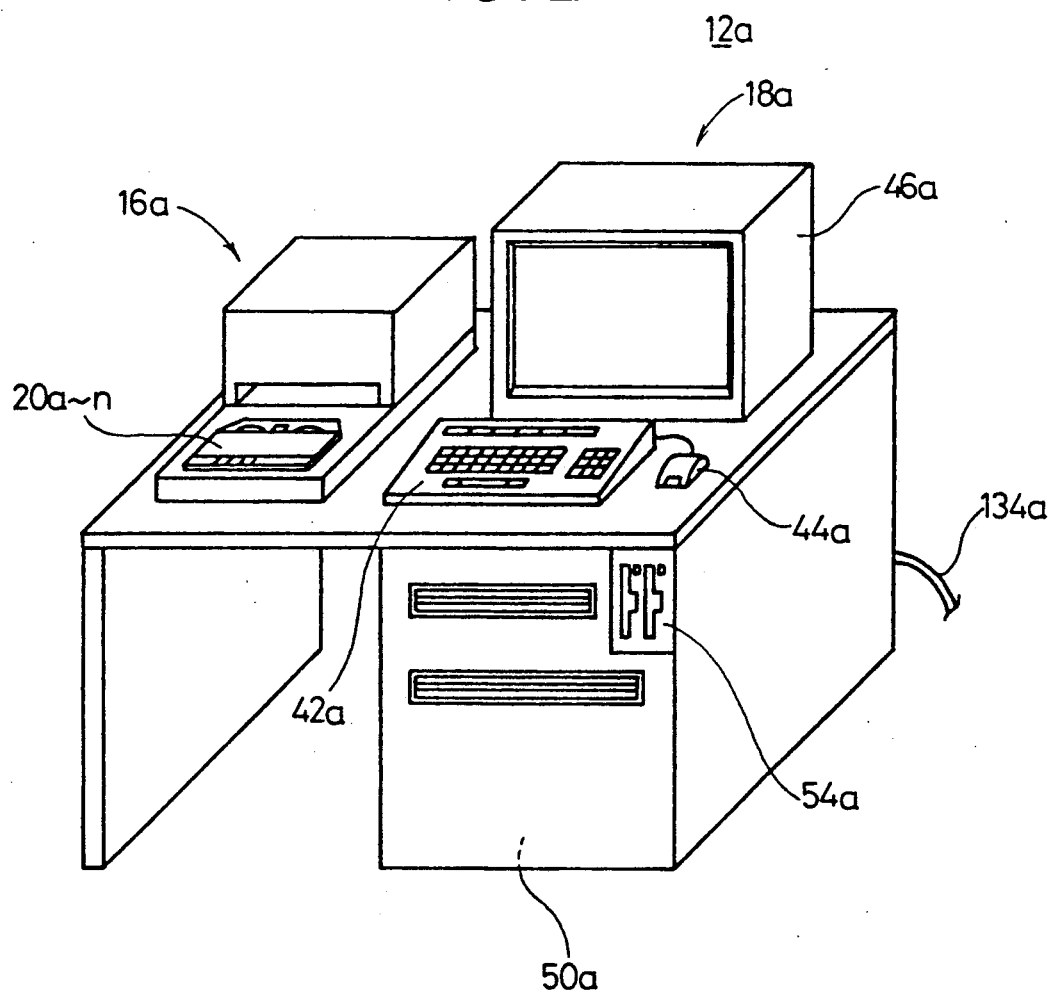
FIG. 2 is a perspective view showing an appearance of a preset apparatus employed in the embodiment shown in FIG. 1.
Figure 3:
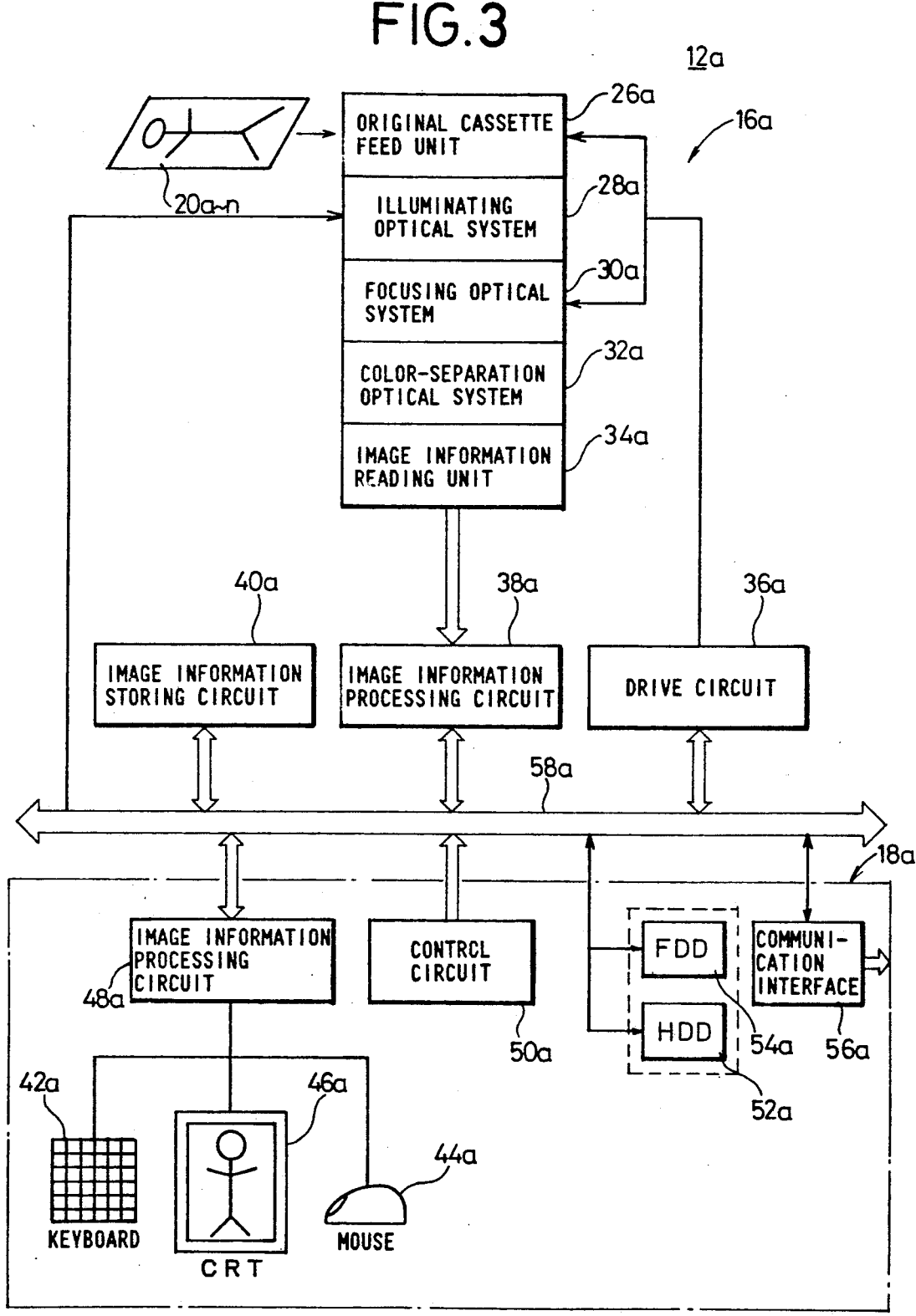
FIG. 3 is a block diagram illustrating a structure of the preset apparatus shown in FIG. 2.

FIG. 2 is a perspective view showing an appearance of the preset apparatus 12a. FIG. 3 is a block diagram showing a structure of the preset apparatus 12a.

In the drawings, designated at numeral 12a is a preset apparatus, whereas designated at numeral 16a is a pre-scan device.

The pre-scan device 16a comprises an original cassette feed unit 26a for feeding original cassettes 20a through 20n, an illuminating optical system 28a for applying illuminating light to originals S held in the original cassettes 20a through 20n, a focusing optical system 30a for focusing transmitted light produced by applying the illuminating light to the originals S, a color-separation optical system 32a for separating the transmitted light bearing image information into three primary colors, and an image information reading unit 34a comprising a CCD or the like, for photoelectrically reading the focused transmitted light.

Further, the pre-scan device 16a comprises a drive circuit 36a for driving the original cassette feed unit 26a and the focusing optical system 30a or the like, an image information processing circuit 38a for processing image information which has photoelectrically been read by the image information reading unit 34a, and an image information storing circuit 40a for storing therein information outputted from the image information processing circuit 38a.

The set-up device 18a comprises a keyboard 42a and a mouse 44a for inputting information such as setup conditions, etc., a CRT 46a for displaying thereon the information about the set-up conditions and image information or the like read from an original S, an image information processing circuit 48a for controlling the keyboard 42a, the mouse 44a and the CRT 46a or the like, and a control circuit 50a for controlling the pre-scan device 16a and the set-up device 18a.

The set-up device 18a comprises a hard disk drive (hereinafter be called "HDD") 52a and a floppy disk drive (hereinafter be called "FDD") 54a as means for storing therein information about set-up conditions or the like set by the keyboard 42a and the mouse 44a, and a communication interface 56a used to communicate with the main scan apparatus 14.

Designated at numeral 58a is a bus used to connect the set-up device 18a and the pre-scan device to each other.

Incidentally, the above description has been made of the preset apparatus 12a as one example. However, the preset apparatuses 12b through 12n can also be constructed in the same manner as described above.

Figure 4:
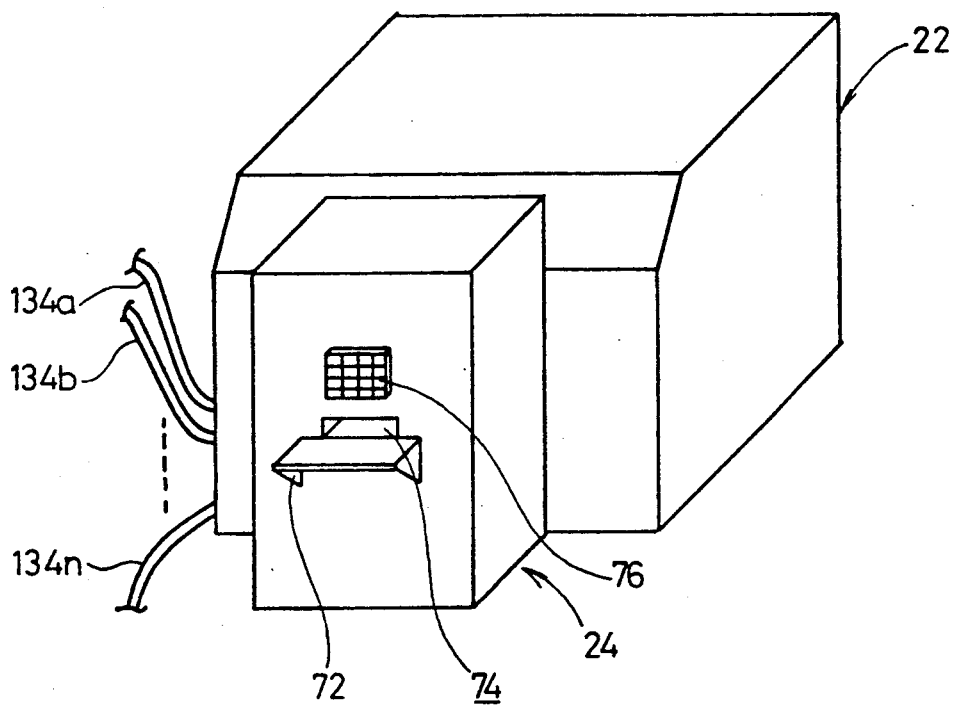
FIG. 4 is a perspective view showing a structure of a main scan apparatus employed in the embodiment shown in FIG. 1.
Figure 5:
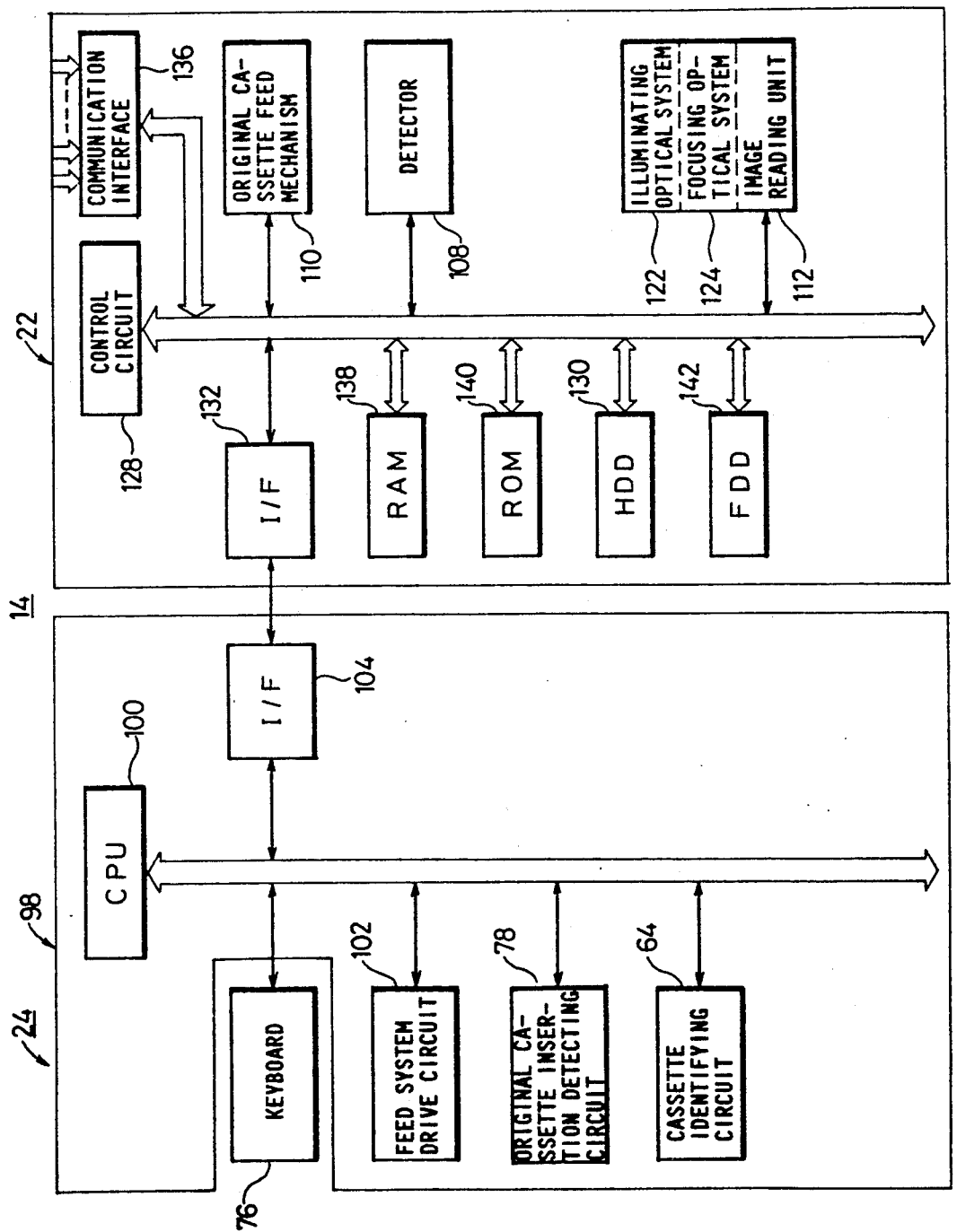
FIG. 5 is a block diagram depicting a structure of the main scan apparatus shown in FIG. 4.

FIG. 4 is a perspective view showing an appearance of the main scan apparatus 14. FIG. 5 is a block diagram illustrating a structure of the main scan apparatus 14.

In the drawings, there are shown a main scan apparatus designated at numeral 14, the image reading device designated at numeral 22, and the original cassette feeding device designated at numeral 24.

Figure 6:
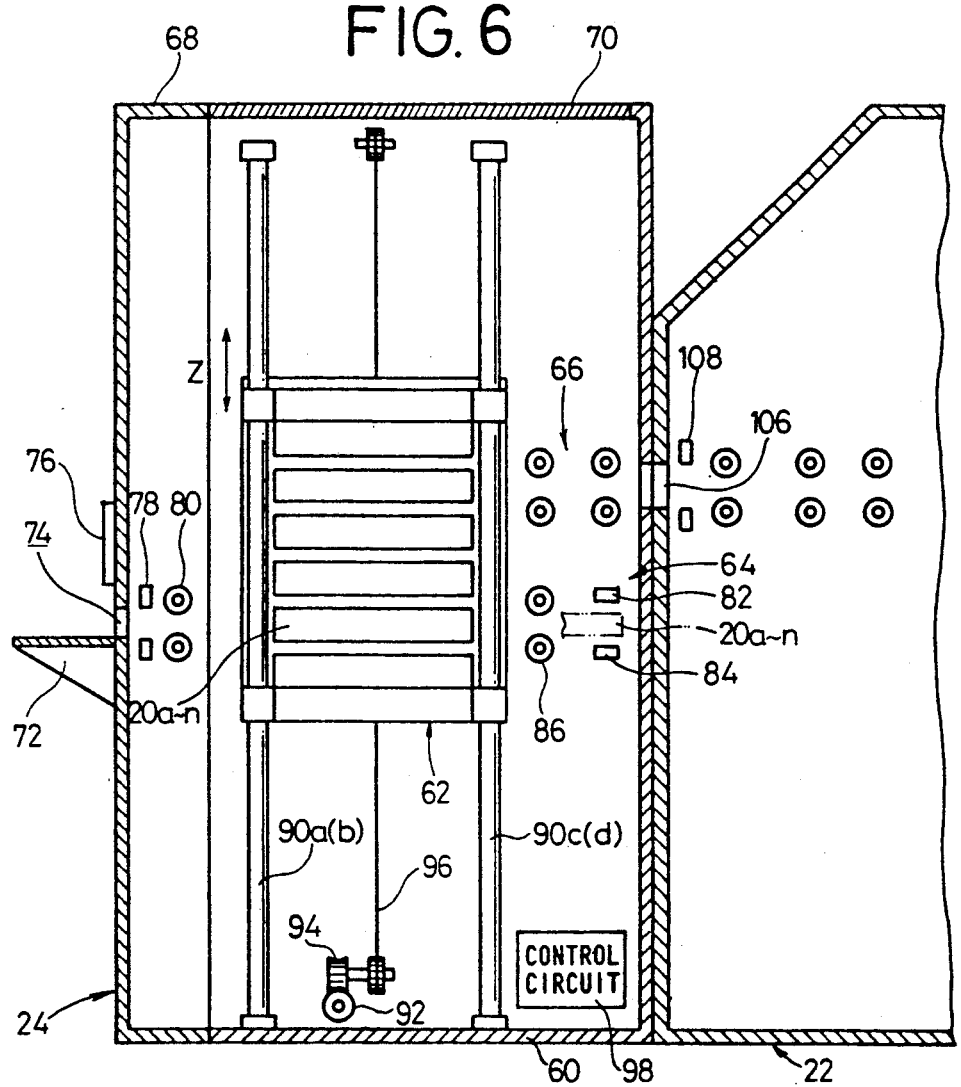
FIG. 6 is a longitudinal cross-section showing an original cassette feeding apparatus connected to the main scan apparatus shown in FIG. 4.
Figure 7:
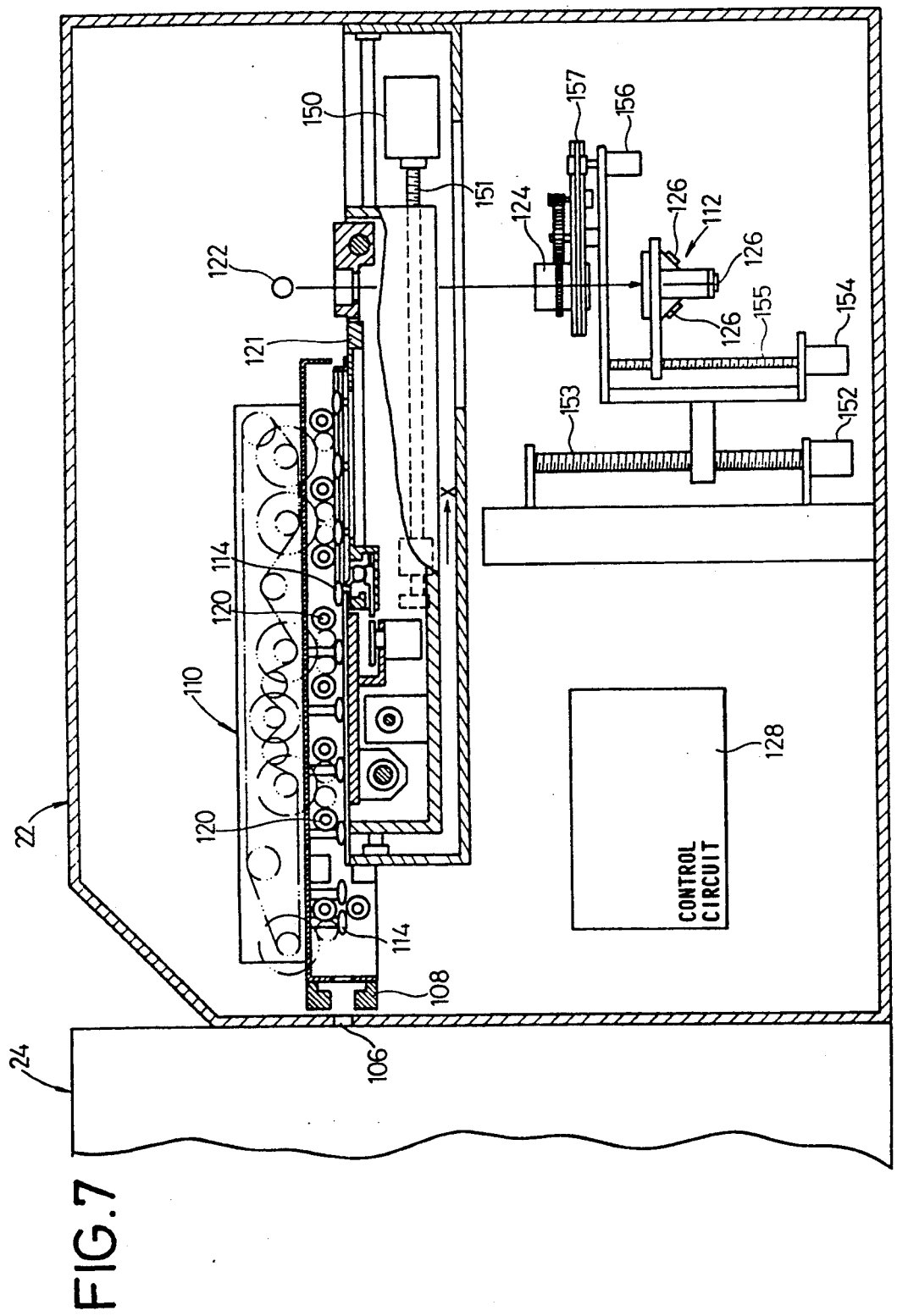
FIG. 7 is a longitudinal cross-section illustrating an image reading device in the main scan apparatus shown in FIG. 4.

FIG. 6 is a longitudinal cross-section of the original cassette feeding device 24. FIG. 7 is a longitudinal cross-section of the image reading device 22.

The original cassette feeding device 24 shown in FIG. 6 is enclosed with a casing 60, and comprises a cassette holding means 62 for holding therein the original cassettes 20a through 20n, a cassette identifying circuit 64 for identifying the original cassettes 20a through 20n, and a cassette feeding means 66 for selectively feeding the original cassettes 20a through 20n held in the cassette holding means 62 to the image reading device 22 to which the original cassette feeding device 24 is connected.

The casing 60 has a first cover 68 whose front and upper portions can be opened and closed, and a second cover 70. A cassette insertion table 72, a cassette insertion hole 74 and a keyboard 76 are respectively provided at external predetermined positions of the first cover 68.

There are provided at a portion corresponding to the cassette insertion hole 74 in the first cover 68, an original cassette insertion detecting circuit 78 such as a photointerrupter for detecting whether or not any one of the original cassettes 20a through 20n is inserted into the cassette insertion hole 74, and a pair of carrying-in rollers 80 for carrying the original cassettes 20a through 20n into the original cassette feeding device 24.

The cassette identifying means 64 comprises respective sets of a plurality of light-emitting devices 82 and light-detecting devices 84. In addition, the cassette identifying means 64 reads information set to a cassette identifying unit 88 to be described later, of each of the original cassettes 20a through 20n delivered by a pair of feeding rollers 86, thereby identifying the type of each of the original cassettes 20a through 20n and that of an original S or the like.

The cassette holding means 62 comprises a cage supported by four guide bars 90a through 90d provided upright in the casing 60. In addition, the cassette holding means 62 can be moved in upward and downward directions (i.e., in the direction indicated by the arrow Z) by means of a worm gear 94 and a chain 96 coupled to an electric motor 92.

The original cassette feeding device 24 has a control circuit 98, which comprises a CPU 100, a feed system drive circuit 102, and an interface 104 used to communicate with the image reading device 22, as shown in FIG. 5. The feed system drive circuit 102 is operated to activate the cassette feeding means 66, the carrying-in rollers 80 and the electric motor 92 or the like.

A description will now be made of a structure of the image reading device 22 with reference to FIGS. 5 and 7.

The image reading device 22 has a cassette insertion slot 106 which communicates with the original cassette feeding device 24, and a detector 108 disposed near the cassette insertion slot 106, for identifying type of each of the original cassettes 20a through 20n inserted therein and that of each of originals S held in the original cassettes 20a through 20n.

On the other hand, one end of a original cassette feed mechanism 110 is disposed near the detector 108, whereas the other end thereof extends to a table 121 for placing each of the original cassettes 20a through 20n thereon. The feed mechanism 110 has a plurality of guide rollers 114, which are in turn held in point-to-point contact with V-shaped grooves 116a, 116b defined in the original cassettes 20a through 20n, respectively.

Further, the feed mechanism 110 is brought into contact with a feed surface of a frame 118 of each of the original cassettes 20a through 20n, and has a plurality of rotatably driven feed rollers 120. The original cassettes 20a through 20n are fed by the feed rollers 120 respectively.

Furthermore, the feed mechanism 110 includes an electric motor 150 as a drive source for feeding the original cassettes in an auxiliary feeding direction, and a ball screw 151 as a transmission means of the drive source.

The image reading unit 112 for photoelectrically reading color image information carried by an original S as image information corresponding to the colors of R, G, B comprises an illuminating optical system 122 as a light source for applying illuminating light to the original S, a focusing optical system 124 as a focusing lens, and photoelectric transducers 126 comprised of a plurality of CCDs. The electric motor 152 and the ball screw 153 are activated to displace the image reading unit 112 along the optical axis.

Further, the image reading unit 112 includes an electric motor 154 as a focusing drive source, and a ball screw 155 coupled to the electric motor 154, and has an electric motor 156 for aligning the center of the focusing lens 124 with the optical axis and a transmission mechanism 157.

As illustrated in FIG. 5, the image reading device 22 has a control circuit 128. The control circuit 128 includes a HDD 130 as a memory device for storing therein image information of an original S read by the image reading unit 112, an interface 132 used to communicate with the original cassette feeding device 24, a communication interface 136 electrically connected to the communication interfaces 56a through 56n of the set-up devices 18a through 18n and 134a through 134n (see FIG. 4) for thereby performing the transmission of information, a RAM 138 as a control memory means, a ROM 140, and a FDD 142 for reading setup information stored in a floppy disk.

Incidentally, the communication interface 136 of the image reading device 22 is electrically connected to each of the communication interfaces 56a through 56n of the set-up devices 18a through 18n in accordance with a connecting method based on the RS232C standard.

The image reading device 112 reads image information of originals S carried by the original cassettes 20a through 20n. However, the structure of each of the original cassettes 20a through 20n fed to the original feeding device 24 will now be described with reference to FIG. 8 which shows the structure of the original cassette 20a.

The original cassette 20a comprises the frame 118 of a substantially square shape and an transmissive original S held between two support glass panels 144a and 144b enclosed with the frame 118. The frame 118 of the original cassette 20a has V-shaped grooves 116a, 116b defined in opposite sides thereof as seen in the original feeding direction (i.e., in the direction indicated by the arrow X) and extending in the original feeding direction.

The cassette identifying unit 88 for identifying the original cassette 20a and the original S held therein is disposed on the upper surface of the leading end of the frame 118 which extends along the original feeding direction. The cassette identifying unit 88 comprises a plurality of light-transmissive portions 146 and a plurality of light-intransmissive portions 146b for identifying the type of the original cassette 20a and the original S.

Operation and effects of the image information reading system constructed as described above will now be described with reference to FIGS. 1 through 9.

Figure 8:
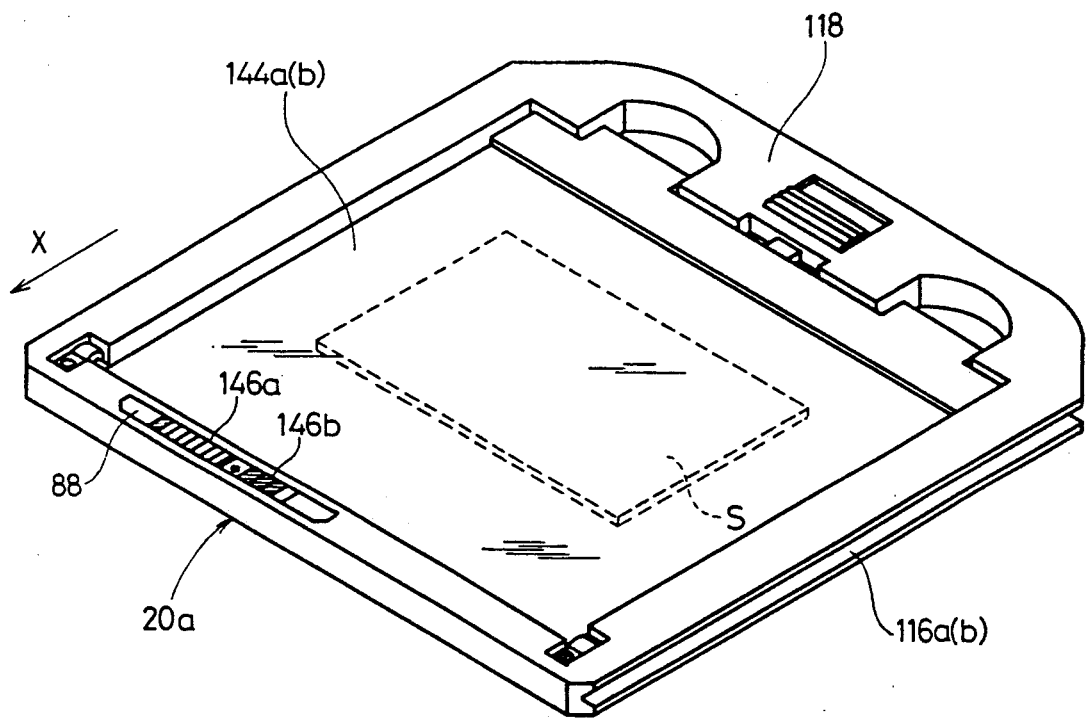
FIG. 8 is a perspective view showing an original cassette employed in the system for and the method of reading the image information in FIG. 1.
Figure 9:
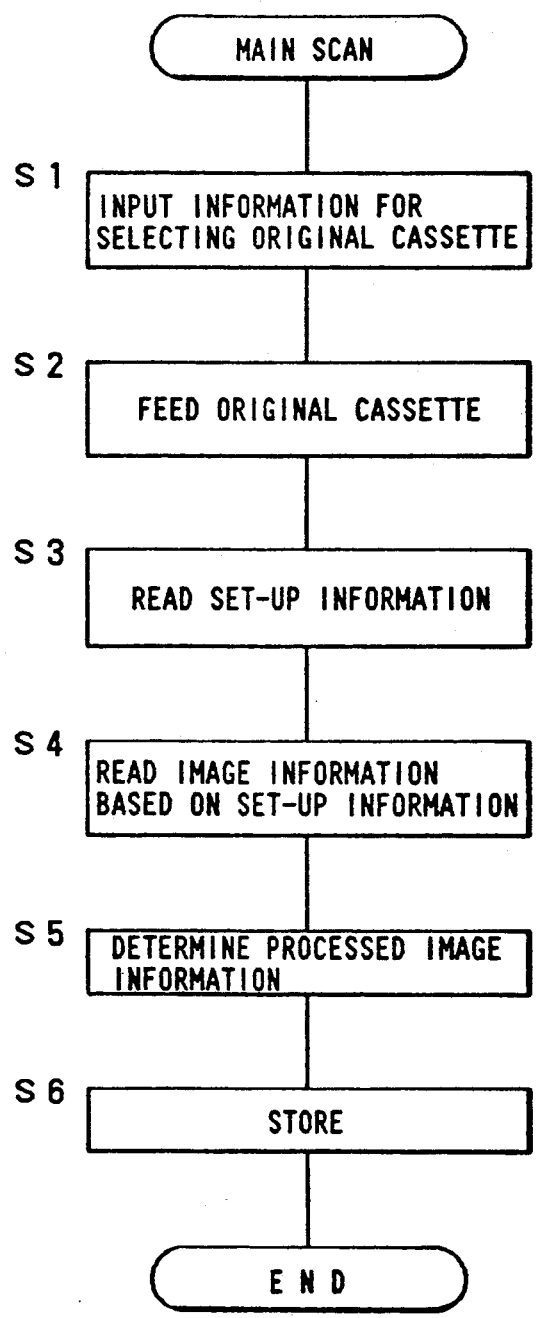
FIG. 9 is a flowchart for describing a main scanning process in the system for and the method of reading the image information.

As shown in FIG. 8, an original cassette 20a with a transmissive original S held therein, for example, is first inserted into, for example, a pre-scan device 16a out of a plurality of pre-scan devices 16a through 16n (see FIG. 2). The original cassette feed unit 26a of the pre-scan device 16a is activated to feed the original cassette 20a to a position where image information is to be read, after which illuminating light from the light source of the illuminating optical system 28a is applied to the original S at the image information reading position.

The illuminating light which transmits the original S is focused on the image information reading unit 34a comprised of the CCD through the focusing optical system 30a and the color-separation optical system 32a, thereby photoelectrically reading it by the CCD as image information. Then, the image information is subjected to image processing in the image information processing circuit 38a. The so-processed image information is thereafter stored in the image information storing circuit 40a and displayed on the CRT 46a through the image information processing circuit 48a under the control of the control circuit 50a of the set-up device 18a.

The operator establishes set-up operations, i.e., scanning conditions (trimming, magnification, turning angle, type of halftone dot, number of lines, selection of color photographic process, etc.) and image processing conditions (highlight, the degree of shadows, gradation, color collection, sharpness, etc.) with the keyboard 42a and the mouse 44a, while taking out the original cassette 20a from the pre-scan device 16a and comparing the original S held in the original cassette 20a with the image information displayed on the CRT 46a.

In this case, the mouse 44a enables the operator to indicate locations with respect to the image information displayed on the CRT 46a and to select a specific region of the image information. In addition, the mouse 44a can also select one of menus displayed on the CRT 46a and one of graphically-displayed instruction buttons. The keyboard can input numerical values or the like to the so-selected specific region.

A description will now be made of a setting up, for example, trimming of the image information displayed on the CRT 46a with the keyboard 42a and the mouse 44a.

The operator uses the mouse 44a to designate a trimming point to the image information displayed on the CRT 46a. When information indicative of completion of the designation of the trimming point to the image information is inputted through the keyboard 42a by the operator, such information is stored on a hard disk through the HDD 52a under the control of the control circuit 50a.

The operator then removes the original cassette 20a in which the setting up of the image information is completed, from the pre-scan device 16a. Thereafter, the original cassette 20a thus removed is inserted into the cassette insertion hole 74 of the original cassette feeding device 24.

The CPU 100 of the control circuit 98 at the time that the insertion of the original cassette 20a into the cassette insertion hole 74 is detected by the original cassette insertion detecting circuit 78 such as the photointerrupter of the original cassette feeding device 24, is activated to energize the feed system drive circuit 102 so as to drive the carrying-in rollers 80, thereby introducing the original cassette 20a into the original cassette feeding device 24 so as to accommodate the same in the cassette holding means 62.

Then, the original cassette 20a enters between the light-emitting devices 82 of the cassette identifying means 64 and the light-detecting devices 84 thereof. Further, the cassette identifying unit 88 reads information for identifying the type of the original cassette 20a and the original S held in the original cassette 20a with the cassette identifying means 64. Thereafter, the original cassette 20a is held again in the cassette holding means 62.

At this time, the identification information read by the cassette identifying circuit 64 is stored in the RAM 138 through the I/F 104 and the I/F 132 of the image reading device 22.

The set-up step is completed by the above-described processes.

When the operator inputs on the keyboard 76 information for specifying the original cassette 20a (Step S1), the CPU 100 of the original cassette feeding device 24 is activated to energize the motor 92 so as to cause the worm gear 94 and the chain 96 to move the cassette holding means 62 in the upward and downward directions (i.e., in the direction indicated by the arrow Z), thereby displacing the specified original cassette 20a selected from the cassette holding means 62 in which a plurality of original cassettes 20a through 20n are held, to a position near the cassette feeding means 66.

The original cassette 20a is then supplied through the cassette insertion slot 106 to the image reading device 22 under the action of the cassette feeding means 66 (see FIG. 6).

Then, the control circuit 128 of the image reading device 22 at the time that the original cassette 20a inserted from the cassette insertion slot 106 is detected by the detector 108 is activated to energize the original cassette feed mechanism 110 so as to rotatably drive the feed rollers 120, thereby feeding the original cassette 20a up to the cassette placement table 121 (Step S2).

Further, the control circuit 128 communicates with the pre-set apparatus 12a having set-up information of the original cassette 20a so as to read the set-up conditions, based on the information for specifying the original cassette 20, which is inputted from the keyboard 76.

In this case, the control circuit 128 reads out the trimming information stored in the HDD 52a of the set-up device 18 through the communication interfaces 136 and 56a (Step S3).

Then, the control circuit 128 reads image information of an original S which is focused on the photoelectric transducers 126 of the image reading unit 112, based on the trimming information thus read (Step S4).

If the scanning conditions other than the trimming information read from the HDD 52a of the set-up device 18a, for example, the magnification, the turning angle, the type of halftone dot, the number of lines, the selection of the color photographic process, etc. are set up, then the control circuit 128 of the image reading device 22 reads the image information of the original S based on these conditions. In addition, the control circuit 128 processes the previously read image information based on the image processing conditions such as highlights, the degree of shadows, gradation, color collection, sharpness, etc. (Step S5). Then, the so-processed image information is stored in the HDD 130 (Step S6).

Thus, the main scan apparatus 14 can determine desired processed image information by processing the read image information of the original S based on the scanning conditions and the image processing conditions in accordance with the above-described process.

In this case, the original cassette feeding device 24 can accommodate a plurality of original cassettes 20a through 20n. Thus, if the set up original cassettes 20a through 20n are successively stored in the original cassette feeding device 24, then a main scan operation of the scan apparatus 14 can continuously be carried out based on the set-up information by simply selecting any of the original cassettes 20a through 20n with the keyboard 76.

When the single main scan apparatus 14 is electrically connected to the preset apparatuses 12a through 12n and communication paths are provided therebetween in the above-described manner, desired set-up information can be read as needed. Therefore, a prescan process, a set-up process and a main scan process can independently be carried out.

Thus, the main scan apparatus 14 can be activated continuously by using a plurality of preset apparatuses 12a through 12n even when the pre-scan process and the set-up process make it necessary to spend much time as compared to the main scan process.

In the present embodiment, the communication circuits based on the RS232C standard are adopted as the means for transmitting the set-up information from one of the set-up devices 18 to the image reading device 22. However, as an alternative to this method, set-up information, which is established in advance, is stored in the floppy disk through the respective ones FDD 54 of the set-up devices 18, and thereafter the FDD 142 of the image reading device 22 is loaded with the floppy disk, thereby making it possible to transmit the set-up information thus established to the image reading device 22.

Further, according to the present embodiment, the image information reading system 10 comprises the plurality of preset apparatuses 12a through 12n and the single main scan apparatus 14. However, the image information reading system 10 can also comprise a plurality of preset apparatuses 12a through 12n and a plurality of main scan apparatuses 14 in order to improve the operating efficiency of the respective apparatuses.

According to the image information reading system of the present embodiment, as has been described above, the following advantageous effects can be brought about.

More specifically, the preset apparatuses 12a through 12n and the main scan apparatus 14 are disposed, and the set-up process and the main scan process can independently be carried out. In addition, the main scan apparatus 14 can continuously be operated by installing plural numbers of those preset apparatuses 12a through 12n which require much operating time.

Thus, the whole operating efficiency of the image information reading system can be increased and the respective apparatuses can efficiently be used without stopping the operations of the respective apparatuses within the operating time in a day.

Having now fully described the invention, it will be apparent to those skilled in the art that many changes and modifications can be made without departing from the spirit or scope of the invention as set forth herein.

What is claimed is:

1. An image information reading system comprising:
    a plurality of preset apparatuses each having a first scan mechanism for reading image information carried by an original while scanning the same, and processing condition setting-up means for setting up scanning conditions of said read image information and image processing conditions used to process said read image information; and
    at least one main scan apparatus having a second scan mechanism for reading image information recorded on an original while scanning the same, and image information processing means for processing said image information read by said second scan mechanism on the basis of said scanning conditions and said image processing conditions determined by one of said preset apparatuses.

2. An image information reading system according to claim 1, wherein said preset apparatuses exceed in number said main scan apparatus.

3. A method of reading image information, comprising the following steps:
    a first step of performing a pre-scan operation for reading an original storing image information at a coarse pitch by a pre-scan device;
    a second step of setting scanning conditions and image information processing conditions to said read image information with a set-up device;
    a third step of specifying an original cassette storing a desired original by original cassette specifying means disposed in an original cassette feeding device;
    a fourth step of reading set-up information of said original held in said specified original cassette from said set-up device; and
    a fifth step of carrying out a main scan operation for reading an original at a fine pitch by a main scan apparatus based on said scanning conditions included in said set-up information.

4. A method according to claim 3, wherein said first and second steps are carried out by a preset apparatus comprising said pre-scan device and said set-up device, and said fifth step is performed by said main scan apparatus.

5. A method according to claim 3, wherein a cassette detector of said main scan apparatus includes a step for reading information used to specify a desired original cassette, said information being applied to each of original cassettes which are fed.

* * * * *